United States Patent Office 3,151,079
Patented Sept. 29, 1964

3,151,079
POLYPHENYL ETHER STABILIZERS
Wesley L. Archer, Midland, Mich., assignor to The Dow Chemical Company, Midland, Mich., a corporation of Delaware
No Drawing. Filed Sept. 5, 1961, Ser. No. 135,721
3 Claims. (Cl. 252—51.5)

The present invention relates to antioxidants and viscosity improvers for polyphenyl ether high-temperature, high-pressure lubricants. More particularly the present invention concerns the use of and polyphenyl ether composition containing a member of the following class of compounds:

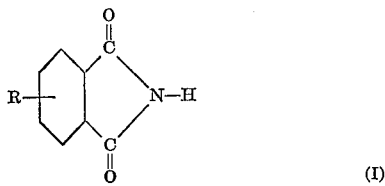

wherein R represents hydrogen or the benzoyl radical. These compounds have been tested and found to reduce the degradation of the class of high-temperature, high-pressure lubricants having the general formula

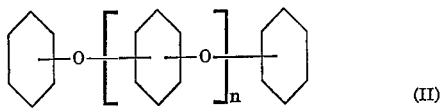

wherein $n$ is an integer from 2 to 6 or more. The employment of as little as 0.25% by weight of one of the compounds falling within the scope of Formula I, based on the weight of the total composition, will reduce degradation of the polyphenyl ether lubricants and thus reduce the viscosity increase of the lubricant composition due to such degradation. Good results are achieved when employing from about 0.25 to about 1.5% by weight of one of the compounds falling within Formula I, i.e., phthalimide, ar-benzoyl phthalimide.

It has been found that the viscosity of the class of polyphenyl ethers of Formula II increases when degradation occurs under high-temperature operations. Therefore, the increase in viscosity became a convenient measure of the degree of degradation which occurs in polyphenyl ethers during high temperature tests wherein oxygen is introduced to simulate actual operation as a lubricant in various systems. The use of viscosity as a measure of degree of degradation and/or stabilization resolved itself readily to mathematical terms illustrating percent stabilization according to the following equation:

$$\frac{V_1-V_2}{V_1} \times 100 = \text{Percent stabilization}$$

$V_1$=percent viscosity increase of unstabilized polyphenyl ether after oxidation treatment
$V_2$=percent viscosity increase of stabilized polyphenyl ether after oxidation treatment The term "percent stabilization" is used hereinafter to have the meaning above assigned and is calculated as above set forth.

The following examples illustrate the present invention but are not to be construed as limiting.

Example 1

A 50 g. sample of bis(phenoxyphenyl)ether containing various amounts of phthalimide was prepared by heating a suspension of phthalimide in bis(phenoxyphenyl)ether on a steam bath. The solutions were then heated at 600° F. for 24 hours while bubbling 3 1. of air per hour through a sparger near the bottom of the liquid. The initial and final viscosities were determined by an Ostwald viscometer tube. An uninhibited control sample was treated in the same manner. The following table records the percent stabilization of each stabilized sample when compared to the control.

| Inhibitor percent by weight | Percent stabilization |
|---|---|
| None | 0 |
| 0.25 | 39 |
| 0.50 | 39 |
| 0.75 | 39 |
| 1.0 | 39 |

Example 2

In a manner similar to that employed in Example 1, employing 1% by weight of ar-benzoyl phthalimide in place of phthalimide, the percent stabilization was found to be 42%.

I claim:
1. A high pressure, high-temperature lubricant composition consisting essentially of the polyphenyl ether having the formula

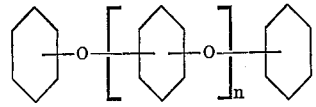

wherein $n$ represents an integer from 2 to 6, and, as the essential antioxidant and viscosity improver, an effective amount of a compound having the formula

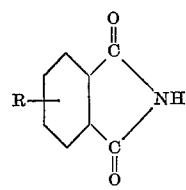

wherein R represents a member selected from the group consisting of hydrogen and benzoyl.

2. A high-pressure, high-temperature lubricant composition consisting essentially of the polyphenyl ether having the formula

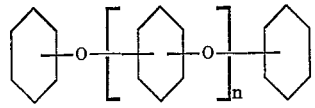

wherein $n$ represents an integer from 2 to 6, and from 0.25 to about 1.5% by weight, based on the total composition, of phthalimide.

3. A high pressure, high-temperature lubricant composition consisting essentially of the polyphenyl ether having the formula

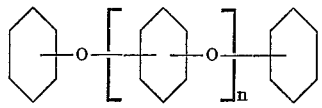

wherein $n$ represents an integer from 2 to 6, and from 0.25 to about 1.5% by weight, based on the total composition, of ar-benzoyl phthalimide.

References Cited in the file of this patent

UNITED STATES PATENTS

| | | |
|---|---|---|
| 2,228,325 | Olin et al. | Jan. 14, 1941 |
| 2,330,239 | Prutton | Sept. 28, 1943 |
| 2,574,987 | Shelley | Nov. 13, 1951 |
| 2,940,929 | Diamond | June 14, 1960 |

FOREIGN PATENTS

| | | |
|---|---|---|
| 423,938 | Great Britain | Feb. 11, 1935 |

OTHER REFERENCES

C & EN (Chemical and Engineering News), April 13, 1959, pp. 64–65.